United States Patent
Chen et al.

(10) Patent No.: US 12,361,196 B2
(45) Date of Patent: Jul. 15, 2025

(54) DRC TEST PATTERN GENERATION METHOD AND APPARATUS, ELECTRONIC DEVICE, AND STORAGE MEDIUM

(71) Applicant: CHANGXIN MEMORY TECHNOLOGIES, INC., Hefei (CN)

(72) Inventors: Chuanjiang Chen, Hefei (CN); Li Bai, Hefei (CN); Kang Zhao, Hefei (CN)

(73) Assignee: CHANGXI MEMORY TECHNOLOGIES, INC., Hefei (CN)

( * ) Notice: Subject to any disclaimer, the term of this patent is extended or adjusted under 35 U.S.C. 154(b) by 684 days.

(21) Appl. No.: 17/658,516

(22) Filed: Apr. 8, 2022

(65) Prior Publication Data

US 2023/0055464 A1    Feb. 23, 2023

Related U.S. Application Data

(63) Continuation of application No. PCT/CN2021/113624, filed on Aug. 19, 2021.

(30) Foreign Application Priority Data

Aug. 13, 2021   (CN) .......................... 202110929808.8

(51) Int. Cl.
  *G06F 30/398* (2020.01)
  *G06F 30/392* (2020.01)
  *G06F 111/02* (2020.01)

(52) U.S. Cl.
  CPC .......... *G06F 30/398* (2020.01); *G06F 30/392* (2020.01); *G06F 2111/02* (2020.01)

(58) Field of Classification Search
  CPC .... G06F 30/392; G06F 30/39; G06F 2119/18; G06F 21/79; G06F 2111/20;
  (Continued)

(56) References Cited

U.S. PATENT DOCUMENTS

2008/0003510 A1\* 1/2008 Harazaki ................... G03F 1/36
                                                                          430/5
2014/0282331 A1    9/2014 Yuan et al.
(Continued)

FOREIGN PATENT DOCUMENTS

CN       105095535 A    11/2015
CN       109086481 A    12/2018
(Continued)

*Primary Examiner* — Binh C Tat
(74) *Attorney, Agent, or Firm* — Syncoda LLC; Feng Ma

(57) ABSTRACT

A DRC test pattern generation method includes: receiving a DRC test pattern generation request, the DRC test pattern generation request carrying the number of correct patterns and the number of erroneous patterns; acquiring layout design rule information and corresponding layer configuration information, the layer configuration information including process layer configuration parameter information that is set according to a process type; parsing parameter information corresponding to each rule in the layout design rule information and the process layer configuration parameter information in the layer configuration information, and generating formatted parameter information corresponding to the each rule; and generating a corresponding number of correct patterns and a corresponding number of erroneous patterns corresponding to each rule according to the formatted parameter information.

9 Claims, 9 Drawing Sheets

(58) Field of Classification Search
CPC .......... G06F 2221/033; G06F 2119/12; G06F 30/327; G06F 30/33; G06F 30/20; G06F 30/3323; G06F 30/337; G06F 11/3684; G06F 2111/02; G06F 2111/08; G06F 2111/04; G06F 30/398; G06F 30/367; G06F 30/373; G06F 30/394; G06F 2119/10; G06F 2115/08; G06F 2111/12; G03F 7/70441; G03F 1/70; G03F 7/70433; G03F 7/70633; G03F 7/705; G03F 1/68; G03F 1/44; G03F 1/76; G03F 7/70425
USPC .................................................. 716/108–115
See application file for complete search history.

(56) References Cited

U.S. PATENT DOCUMENTS

| | | | |
|---|---|---|---|
| 2016/0125120 A1* | 5/2016 | Yu | H01L 21/027 |
| | | | 716/52 |
| 2018/0121594 A1 | 5/2018 | Studders | |
| 2020/0134131 A1* | 4/2020 | Tien | G06F 30/398 |
| 2020/0401755 A1 | 12/2020 | Studders | |

FOREIGN PATENT DOCUMENTS

| | | |
|---|---|---|
| CN | 109543308 A | 3/2019 |
| CN | 109923542 A | 6/2019 |
| CN | 111400993 A | 7/2020 |

* cited by examiner

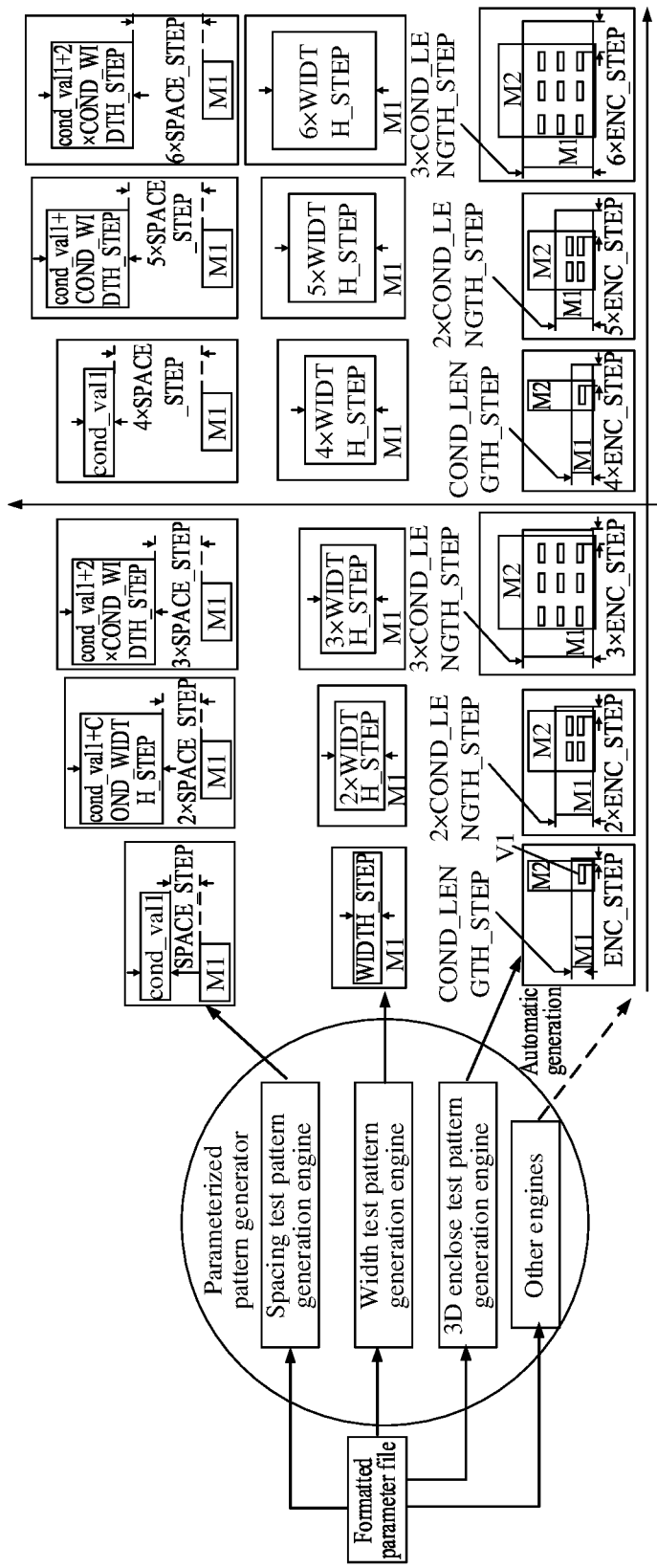

FIG. 7

M1: metal 1, V1: via 1, M2: metal 2   cond_val1: a lower limit value of a layer constraint interval in the rule check trigger condition
ENC_STEP: enclose gradient value   COND_WIDTH_STEP: a gradient value corresponding to the type (width) of the rule check trigger condition
WIDTH_STEP: width gradient value   SPACE_STEP: spacing gradient value
COND_LENGTH_STEP: a gradient value corresponding to the type (line end length) of the rule check trigger condition

DRC TEST PATTERN GENERATION METHOD AND APPARATUS, ELECTRONIC DEVICE, AND STORAGE MEDIUM

CROSS-REFERENCE TO RELATED APPLICATIONS

This is a continuation of International Application No. PCT/CN2021/113624 filed on Aug. 19, 2021, which claims priority to Chinese Patent Application No. 202110929808.8 filed on Aug. 13, 2021. The disclosures of these applications are hereby incorporated by reference in their entirety.

BACKGROUND

The layout-design of an integrated circuit relates to mapping of a designed integrated circuit diagram or a circuit description language to a physical description level, such that the designed integrated circuit can be mapped onto a wafer for production. The layout is a pattern which contains related physical information of the integrated circuit, such as device types, device sizes, relative positions between devices, and connection relationships between the devices, and which consists of the patterns located on different drawing layers. In the manufacturing of the integrated circuit, a wafer manufacturer needs to formulate, according to different process parameters, geometric size constraints on the same process layer and different process layers satisfying a chip manufacturing yield. The set of these geometric size constraints is a layout design rule manual. A layout designer performs layout design according to design rules in the layout design rule manual.

SUMMARY

The disclosure relates to the field of semiconductor integrated circuits, and in particular to a DRC test pattern generation method and apparatus, an electronic device, and a storage medium.

In a first aspect, the embodiments of the disclosure provide a DRC test pattern generation method, including the following operations.

A DRC test pattern generation request is received, the DRC test pattern generation request carrying the number of correct patterns and the number of erroneous patterns.

Layout design rule information and corresponding layer configuration information are acquired, the layer configuration information including process layer configuration parameter information that is set according to a process type.

Parameter information corresponding to each rule in the layout design rule information and the process layer configuration parameter information in the layer configuration information are parsed, and formatted parameter information corresponding to the rule is generated according to the parameter information corresponding to each rule, process layer configuration parameter information associated with each rule, the number of correct patterns, and the number of erroneous patterns, respectively.

The corresponding number of correct patterns and the corresponding number of erroneous patterns corresponding to each rule are generated according to the formatted parameter information corresponding to each rule.

In a second aspect, the embodiments of the disclosure provide a DRC test pattern generation apparatus, including a reception unit, an acquisition unit, a parsing unit and generation unit.

The reception unit is configured to receive a DRC test pattern generation request, the DRC test pattern generation request carrying the number of correct patterns and the number of erroneous patterns.

The acquisition unit is configured to acquire layout design rule information and corresponding layer configuration information, the layer configuration information including process layer configuration parameter information that is set according to a process type.

The parsing unit is configured to parse parameter information corresponding to each rule in the layout design rule information and the process layer configuration parameter information in the layer configuration information, and generate formatted parameter information corresponding to the rule according to the parameter information corresponding to each rule, process layer configuration parameter information associated with each rule, the number of correct patterns, and the number of erroneous patterns, respectively.

The generation unit, configured to generate the corresponding number of correct patterns and the corresponding number of erroneous patterns corresponding to each rule according to the formatted parameter information corresponding to each rule.

In a third aspect, the embodiments of the disclosure provide an electronic device, including a memory, a processor, and a computer program stored on the memory and runnable on the processor. When executing the program, the processor implements the DRC test pattern generation method of the disclosure.

In a fourth aspect, the embodiments of the disclosure provide a computer-readable storage medium having a computer program stored thereon. When executed by a processor, the program implements the steps of the DRC test pattern generation method of the disclosure.

BRIEF DESCRIPTION OF THE DRAWINGS

The accompanying drawings described herein are used for providing further understanding of the disclosure, and constitute a part of the disclosure. The exemplary embodiments of the disclosure and the descriptions thereof are used to explain the disclosure, and do not constitute any inappropriate limitation to the disclosure. In the accompanying drawings:

FIG. 7 is a schematic diagram of a DRC test pattern set generated by a parameterized pattern generator provided by an embodiment of the disclosure.

DETAILED DESCRIPTION

After a layout design is completed, layout data needs to be checked by means of Design Rule Check (DRC). A pattern that does not satisfy the layout design rules cannot be ensured to be achieved on the wafer. DRC needs to cover each and every rule in the layout design rule manual. Because DRC is a crucial part in deciding whether tape-out succeeds in the layout design, it is needed to construct a large number of test patterns for testing the correctness of DRC.

The correctness of DRC is tested mainly by manually constructing correct patterns and erroneous patterns. DRC is used to check the erroneous patterns and report corresponding errors. DRC is used to check the correct patterns and report that no error is detected. Otherwise, it indicates that DRC has an error. If DRC has an error, DRC is adjusted until DRC is ensured to be accurate.

However, the mode of manually constructing a DRC test pattern is time-wasting, and the constructed correct patterns and erroneous patterns cannot include all the design rules in the layout design rule manual, and therefore, the correctness of DRC cannot be ensured.

The embodiments of the disclosure provide a DRC test pattern generation method and apparatus, an electronic device, and a storage medium.

Hereinafter some embodiments of the disclosure are described with reference to the accompanying drawings of the description. It should be understood that the embodiments described herein are only used to explain the disclosure rather than limit the disclosure. The embodiments in the disclosure and features in the embodiments may be combined with each other without a conflict.

Figure 1:
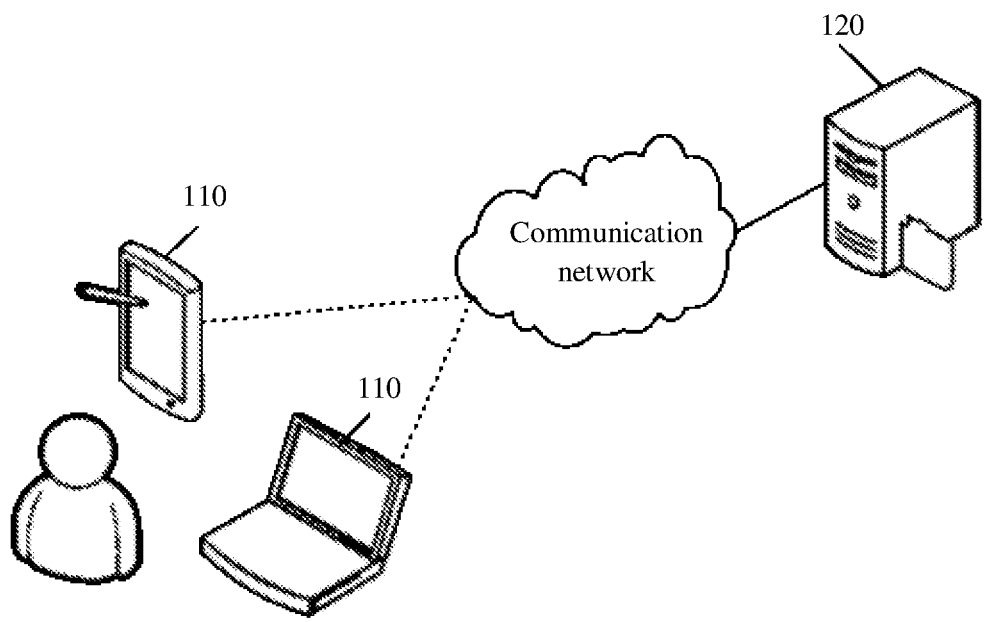
FIG. 1 is a schematic diagram of an application scenario of a DRC test pattern generation method provided by an embodiment of the disclosure.

First, reference is made to FIG. 1. FIG. 1 is a schematic diagram of an application scenario to which a DRC test pattern generation method provided by an embodiment of the disclosure is applied. A terminal 110 and a server 120 may be included. When the server 120 receives a DRC test pattern generation request transmitted by the terminal 110, the server 120 may generate, in a batch mode according to the DRC test pattern generation request, a number of correct patterns and a number of erroneous patterns that are designated by a user and correspond to each rule in a layout design rule manual, and further may transmit the generated correct patterns and erroneous patterns to the terminal 110. The terminal 110 displays the correct patterns and the erroneous patterns to the user.

The server 120 may be an independent physical server, and also may be a cloud server providing basic cloud computing service, such as a cloud server, a cloud database, and a cloud memory. The terminal 110 may be, but not limited to, a smart phone, a tablet computer, a notebook computer, a desktop computer or the like. The terminal 120 and the terminal 110 may be connected by means of a network, and the embodiments of the disclosure do not limit this.

In another application scenario, only the terminal 110 may be included. The user inputs the number of correct patterns and the number of erroneous patterns that are requested to be generated into a terminal device 110, so as to trigger the DRC test pattern generation request. The terminal 110 may generate, in a batch mode according to the DRC test pattern generation request, a number of correct patterns and a number of erroneous patterns that are designated by the user and correspond to each rule in the layout design rule manual, and display them to the user.

According to the embodiments of the disclosure, description is made by only taking the aforementioned first application scenario as an example.

Based on the aforementioned application scenario, the exemplary embodiments of the disclosure are described below in more detail with reference to FIGS. 2 to 7. It should be noted that the aforementioned application scenario is shown only for facilitating understanding the spirit and principle of the disclosure. The implementations of the disclosure are not limited herein. On the contrary, the implementations of the disclosure may be applied to any suitable scenario.

Figure 2:
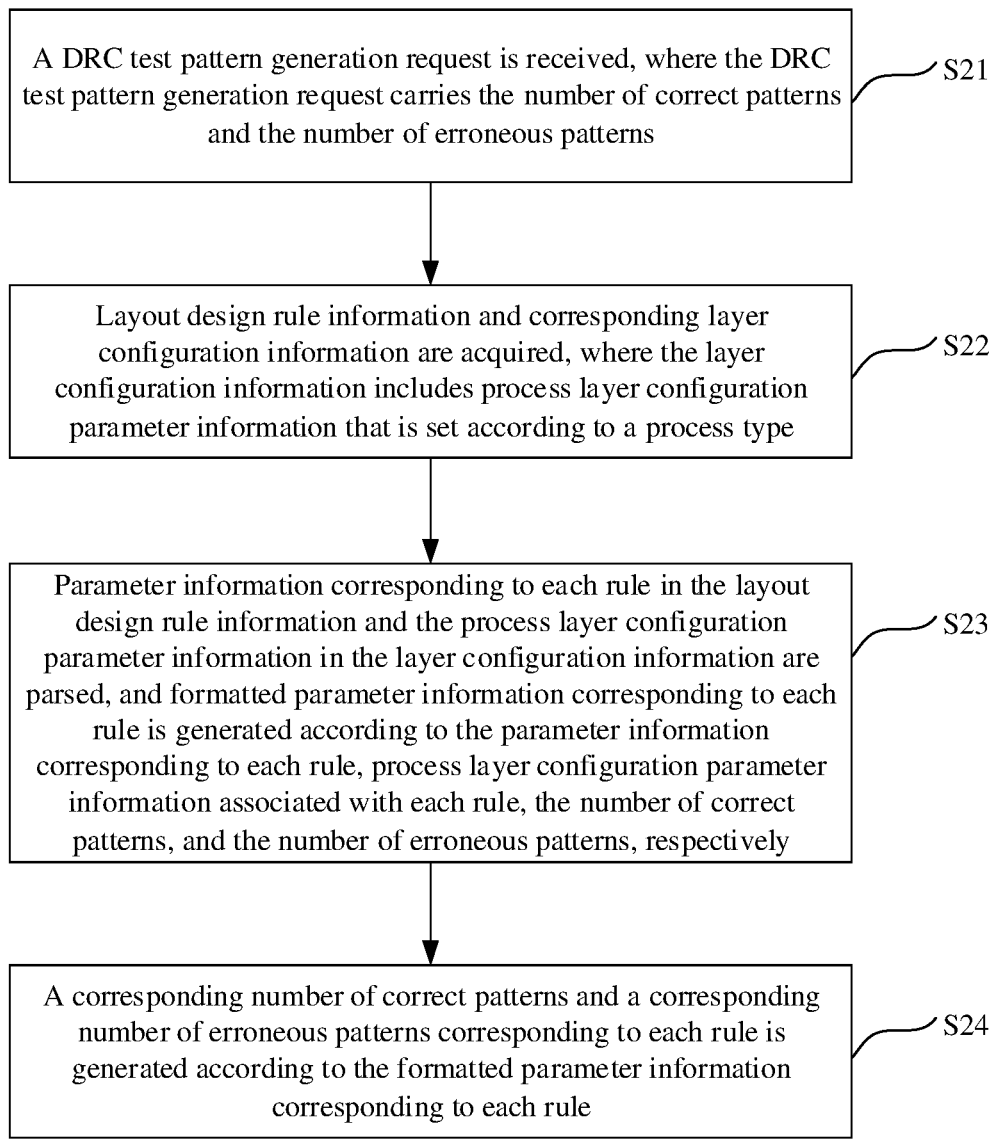
FIG. 2 is a schematic diagram of an implementation flowchart of a DRC test pattern generation method provided by an embodiment of the disclosure.

As shown in FIG. 2, FIG. 2 is a schematic diagram of an implementation flowchart of a DRC test pattern generation method provided by an embodiment of the disclosure. The DRC test pattern generation method may be applied to the aforementioned server 120 and specifically may include the following steps.

At S21, the DRC test pattern generation request is received, the DRC test pattern generation request carrying the number of correct patterns and the number of erroneous patterns.

During specific implementation, the server receives the DRC test pattern generation request transmitted by the terminal. The DRC test pattern generation request carries the number of correct patterns and the number of erroneous patterns that are designated by the user and need to be generated.

At S22, layout design rule information and corresponding layer configuration information are acquired, the layer configuration information including process layer configuration parameter information that is set according to a process type.

During specific implementation, the layout design rule manual and a layer configuration file corresponding to the layout design rule manual may be transmitted to the server by the terminal, and the server receives the layout design rule manual and the layer configuration file transmitted by the terminal. The layout design rule manual is a file which records the layout design rule information, and the layer configuration file includes the layer configuration information. The layer configuration information includes the process layer configuration parameter information that is set according to the process type. The process layer configuration parameter information may at least include the following information: the attribute information of each process layer (i.e., the inherent attribute information of each process layer) and connection relationship information between different process layers.

At S23, parameter information corresponding to each rule in the layout design rule information and the process layer configuration parameter information in the layer configuration information are parsed, and formatted parameter information corresponding to each rule is respectively generated according to the parameter information corresponding to each rule, process layer configuration parameter information associated with each rule, the number of correct patterns, and the number of erroneous patterns.

During specific implementation, a parameter parser is configured in the server. The parameter parser has the function of generating, according to the layout design rule information recorded in the layout design rule manual and the layer configuration information included in the layer configuration file, a new layout design rule parameter file having a uniform format, i.e., a formatted parameter file. The formatted parameter file includes the formatted parameter information corresponding to each layout design rule.

During implementation, the parameter parser parses parameter information corresponding to each rule in the layout design rule manual and the process layer configuration parameter information in the layer configuration file, and according to the parameter information corresponding to each rule, process layer configuration parameter information associated with each rule, the number of correct patterns, and the number of erroneous patterns, respectively generates the formatted parameter information (which also may be called as standardized parameter information) corresponding to each rule. The formatted parameter information corresponding to all the rules constitutes a formatted parameter file (which also may be called as a standardized parameter file). Formatted parameters include rule parameters, rule-related process layer configuration parameters, and DRC test pattern generation step size parameters. The rule parameters are extracted from the parameters corresponding to the rules in the layout design rule manual. The rule-related process layer configuration parameters are extracted from the process layer configuration parameters in the layer configuration file. The rule parameters at least may include the following parameters: a rule identifier, a rule type, a rule constraint interval, and rule check trigger condition parameters. The rule check trigger condition parameters may include a rule check trigger condition type and a layer constraint interval in the rule check trigger condition. The rule-related process layer configuration parameters include layers of rule check, layer attribute parameters, and layers in the rule check trigger conditions. When the trigger condition type feature of a layer specified by the layers in the rule check trigger conditions satisfies the constraint interval, the DRC rule check is triggered. The DRC test pattern generation step size parameters include a gradient value corresponding to the rule type and a gradient value corresponding to the type of the rule check trigger condition. The gradient value corresponding to the rule type decides the gradient value corresponding to the rule type of a generated DRC test pattern. For example, the rule types may include width, area, spacing, and enclose that respectively represent width check, area check, spacing check, and enclose check. When the rule type of a certain rule is width check, the gradient value corresponding to the rule type decides the width gradient value of the generated DRC test pattern. The gradient value corresponding to the type of the rule check trigger condition decides the gradient value corresponding to the type of the rule check trigger condition corresponding to the layer in the rule check trigger condition in the generated DRC test pattern. For example, when the type of the rule check trigger condition is width, the type of the rule check trigger condition represents that the DRC rule check can be triggered only when the width of the layer in the rule check trigger condition satisfies the condition, and in this case, the gradient value corresponding to the type of rule check trigger condition decides the width gradient value of the layer in the rule check trigger condition in the generated DRC test pattern.

During implementation, the gradient value corresponding to the rule type is determined according to the rule constraint interval, the number of correct patterns, and the number of erroneous patterns; and the gradient value corresponding to the type of the rule check trigger condition is determined according to the layer constraint interval in the rule check trigger condition, the number of correct patterns, and the number of erroneous patterns.

Specifically, the gradient value corresponding to the rule type may be determined according to the following modes.

In response to determining that the rule constraint interval only includes an interval lower limit value, a ratio of the interval lower limit value to the number of erroneous patterns is determined as the gradient value corresponding to the rule type; and in response to determining that the rule constraint interval includes an interval upper limit value, a ratio of the interval upper limit value to the number of correct patterns is determined as the gradient value corresponding to the rule type.

The gradient value corresponding to the type of the rule check trigger condition may be determined according to the following modes.

In response to determining that the layer constraint interval in the rule check trigger condition only includes an interval lower limit value, a ratio of the interval lower limit value to the number of erroneous patterns is determined as the gradient value corresponding to the type of the rule check trigger condition; and in response to determining that the layer constraint interval in the rule check trigger condition includes the interval lower limit value and an interval upper limit value, a ratio of a difference value between the interval upper limit value and the interval lower limit value to the number of erroneous patterns is determined as the gradient value corresponding to the type of the rule check trigger condition. The case where the layer constraint interval in the rule check trigger condition only includes the interval lower limit value means being greater than or equal to the interval lower limit value.

Description is made by giving one example below. The rule contents of the layout design rule manual are as shown in Table 1:

TABLE 1

| #No | DRC_RULE_NAME | DESCRIPTION | CONDITION | CONSTRAINTS |
|---|---|---|---|---|
| 1 | Metal1_R1 | Metal1 min width | no | ≥0.55 |
| 2 | Metal1_R2 | Metal1 max width | no | ≤7 |
| 3 | Metal1_R3 | Metal1 min area | no | ≥0.04 |
| 4 | Metal1_R4 | Metal1 min spacing | 0.8 < width < 1.1 | ≥0.11 |
| 5 | Metal1_R5 | Metal1 min line end to line spacing | Line end width ≥ 0.5 | ≥0.33 |
| 6 | V1_R1 | Metal1 min enclose V1 | no | ≥0.55 |
| 7 | V1_R2 | Metal1 3D min enclose V1 | Line end length < 0.88 | ≥2.11 |
| ... | ... | ... | ... | ... |

To facilitate description, the foregoing layout design rule manual only shows part of the rule contents and has a total of 7 rules. A first column is a sequence number (#No); a second column is a rule name (DRC_RULE_NAME); a third column is rule description (DESCRIPTION); a fourth column is a rule check trigger condition (CONDITION); and a fifth column is a rule constraint.

The first rule Metal1_R1 represents the rule 1 of metal 1; the rule description content is Metal1 min width which represents the minimum width of metal 1; the rule check trigger condition is no, which represents none; and the rule constraint is ≥0.55 which represents that the minimum width of metal 1 is greater than or equal to 0.55 (i.e., Metal1 min width≥0.55).

The second rule Metal1_R2 represents the rule 2 of metal 1; the rule description content is Metal1 max width which represents the maximum width of metal 1; the rule check trigger condition is no; and the rule constraint is ≤7 which represents that the maximum width of metal 1 is less than or equal to 7 (i.e., Metal1 max width≤7).

The third rule Metal1_R3 represents the rule 3 of metal 1; the rule description content is Metal1 min area which represents the minimum area of metal 1; the rule check trigger condition is no; and the rule constraint is ≥0.04 which represents that the minimum area of metal 1 is greater than or equal to 0.04 (i.e., Metal1 min area≥0.04).

The fourth rule Metal1_R4 represents the rule 4 of metal 1; the rule description content is Metal1 min spacing which represents the minimum spacing of metal 1; the rule check trigger condition is 0.8<width≤1.1, which represents that when the width satisfies the condition of 0.8<width≤1.1, the rule check is triggered; and the rule constraint is ≥0.11 which represents that the minimum spacing of metal 1 is greater than or equal to 0.11 (i.e., Metal1 min spacing≥0.11).

The fifth rule Metal1_R5 represents the rule 5 of metal 1; the rule description content is Metal1 min line end to line spacing which represents a spacing between the line end of metal 1 to the line of another metal 1; the rule check trigger condition is line end width≥0.5, which represents that when the line end width is greater than or equal to 0.5, the rule check is triggered; and the rule constraint is ≥0.33 which represents that the spacing between the line end of metal 1 and the line of another metal 1 is greater than or equal to 0.33 (i.e., Metal1 min line end to line spacing≥0.33).

The sixth rule V1_R1 represents the rule 1 of via 1; the rule description content is Metal1 min enclose V1 which represents the minimum enclose between metal 1 and via 1; the rule check trigger condition is no; and the rule constraint is ≥0.55 which represents that the minimum enclose between metal 1 and via 1 is greater than or equal to 0.55 (i.e., Metal1 min enclose V1≥0.55).

The seventh rule V1_R2 represents the rule 2 of via 1; the rule description content is Metal1 3D min enclose V1 which represents the minimum enclose between 3D-related metal 1 and via 1; the rule check trigger condition is line end length<0.88, which represents that when the line end length is less than 0.88, the rule check is triggered; and the rule constraint is ≥2.11 which represents that the minimum enclose between 3D-related metal 1 and via 1 is greater than or equal to 2.11 (i.e., Metal1 3D min enclose V1≥2.11).

The layer configuration file corresponding to the foregoing layout design rule manual is not shown. In the embodiments of the disclosure, the process layer configuration parameter information associated with each rule in the layout design rule manual is extracted from the layer configuration file. The formatted parameter information corresponding to each rule is respectively generated according to the parameter information corresponding to the rule in the layout design rule manual, the process layer configuration parameter information associated with each rule, and the number of correct patterns and the number of erroneous patterns that are designated by the user. The constituted formatted parameter file is as shown in Table 2. The formatted parameters are introduced in details below.

TABLE 2

| WIDTH_STEP | AREA_STEP | SPACE_STEP | ENC_STEP | COND_LAYER | COND_CHARACTOR |
|---|---|---|---|---|---|
| 0.55/ B_P_NUM | nil | nil | nil | nil | nil |
| 7/ G_P_NUM | nil | nil | nil | nil | nil |
| nil | 0.04/ B_P_NUM | nil | nil | nil | nil |
| nil | nil | 0.11/ B_P_NUM | nil | M1 | width |
| nil | nil | 0.33/ B_P_NUM | nil | M1 | line end width |
| nil | nil | nil | 0.55/ B_P_NUM | nil | nil |
| nil | nil | nil | 2.11/ B_P_NUM | M1 | line end width |
| . . . | . . . | . . . | . . . | . . . | . . . |

| COND_CONSTRAINTS | COND_WIDTH_STEP | COND_LENGTH_STEP | VIA MAX row/column |
|---|---|---|---|
| nil | nil | nil | nil |
| nil | nil | nil | nil |
| nil | nil | nil | nil |
| (0.8, 1.1] | (1.1-0.8)/ B_P_NUM | nil | nil |
| [0.5,) | 0.5/ B_P_NUM | nil | nil |
| nil | nil | nil | 3:3 |
| (0, 0.88) | nil | 0.88/ B_P_NUM | 3:3 |
| . . . | . . . | . . . | . . . |

| #NO | DRC_RULE_ID | RULE_TYPE | 3D LAYERS | LAYER_ORIENTATION | MTN_MAX | CONSTRAINTS |
|---|---|---|---|---|---|---|
| 1 | Metal1_R1 | WIDTH | 0 | M1 | HORI | min | [0.55,) |
| 2 | Metal1_R2 | WIDTH | 0 | M1 | HORI | min | [0, 7] |
| 3 | Metal1_R23 | AREA | 0 | M1 | HORI | min | [0.04,) |
| 4 | Metal1_R4 | SPACE | 0 | M1 | HORI | min | [0.11,) |

TABLE 2-continued

| | | | | | | | |
|---|---|---|---|---|---|---|---|
| 5 | Metal1_R5 | SPACE | 0 | M1 | HORI | min | [0.33,) |
| 6 | V1_R1 | ENC | 0 | M1, V1, M2 | HORI, VERTI | min | [0.55,) |
| 7 | V1_R2 | ENC | 1 | M1, V1, M2 | HORI, VERTI | min | [2.11,) |
| ... ... | ... | ... | ... ... | ... | ... | ... | |

In Table 2, a first column is a sequence number (#No) and corresponds to the first column in the layout design rule manual in Table 1. A second column is a rule identifier DRC_RULE_ID, uses the rule name (i.e., DRC_RULE_NAME in Table 1) as the rule identifier, and corresponds to the second column in the layout design rule manual in Table 1. A third column is the rule type: RULE_TYPE, including WIDTH-width check, AREA-area check, SPACE-spacing check, and ENC-enclose check. A fourth column is 3D and identifies whether the rule is associated with 3D; when the rule is associated with 3D, the value thereof is 1, and when the rule is not associated with 3D, the value thereof is 0; and 3D represents size check for the same layer in more than one orientation. A fifth column is the layers of the DRC rule check, and the layers are extracted from the layer configuration file. A sixth column is the orientation of the layer (LAYER_ORIENTATION), and the parameter decides that the orientations of the generated correct pattern and erroneous pattern are horizontal or vertical, and is also extracted from the layer configuration file. MIN_MAX in a seventh column represents a maximum value (MAX) or a minimum value (MIN) constrained by the rule, and is acquired from the contents described in DESCRIPTION in Table 1. An eighth column is the rule constraint interval (i.e., the constraint interval of the DRC rule check), i.e., CONSTRAINTS, and corresponds to CONSTRAINTS of the fifth column in Table 1; a parameterized pattern generator generates the erroneous pattern by making the test pattern violate the constraint interval, and generates the correct pattern by making the test pattern conform to the constraint interval; and if the RULE_TYPE in the third column is SPACING (spacing check), then the constraint interval is a spacing constraint interval, and details are not described herein again. The ninth to twelfth columns are gradient values corresponding to the rule types, and respectively are a width gradient value WIDTH_STEP, an area gradient value AREA_STEP, a spacing gradient value SPACE_STEP, and an enclose gradient value WIDTH_STEP; the parameter WIDTH_STEP decides the width gradient value of the generated DRC test pattern, the parameter AREA_STEP decides the area gradient value of the generated DRC test pattern, the parameter SPACE_STEP decides the spacing gradient value of the generated DRC test pattern, and the parameter ENC_STEP decides the enclose gradient value of the generated DRC test pattern. The gradient values corresponding to the foregoing rule types are determined according to the interval values (the interval upper limit value and the interval lower limit value) of respective corresponding rule constraint intervals, and the number of correct patterns and the number of erroneous patterns that are designated by the user. For example, in the first rule Metal1_R1, the rule type is width check, the width constraint interval is [0.55,), and the constraint interval only includes the interval lower limit value of 0.55, then the width gradient value is 0.55/B_P_NUM, and B_P_NUM represents the number of erroneous patterns. In the second rule Metal1_R2, the rule type is width check, the width constraint interval is [0, 7], and the interval upper limit value is 7, then the width gradient value is 7/G_P_NUM, and G_P_NUM represents the number of correct patterns. In the third rule Metal1_R3, the rule type is area check, and the area constraint interval is [0.04,), then the area gradient value is 0.04/B_P_NUM. A thirteenth column is the layer, i.e., COND_LAYER, in a DRC rule check trigger condition, and the layer is extracted from the layer configuration file. A fourteenth column is the type COND_CHARACTOR of the DRC rule check trigger condition, and includes width, line end width, and line end length that are obtained from the rule check trigger condition CONDITION in Table 1. When the type of the rule check trigger condition is width, it represents that the DRC rule check can be triggered when the width of the layer in the rule check trigger condition satisfies the condition. When the type of the rule check trigger condition is line end width, it represents that the DRC rule check can be triggered when the line end width of the layer in the rule check trigger condition satisfies the condition. When the type of the rule check trigger condition is line end length, it represents that the DRC rule check can be triggered when the line end length of the layer in the rule check trigger condition satisfies the condition. The condition that needs to be satisfied is the layer constraint interval COND_CONSTRAINTS in the DRC rule check trigger condition in a fifteenth column, the type COND_CHARACTER feature of the rule check trigger condition of the layer designated by the layer COND_LAYER in the rule check trigger condition satisfies the constraint interval and then the DRC rule check is triggered, and COND_CONSTRAINTS is obtained from the rule check trigger condition in Table 1. The sixteenth and seventeenth columns are gradient values corresponding to the type COND_CHARACTER of the rule check trigger condition. The gradient value corresponding to width and line end width is COND_WIDTH_STEP (the sixteenth column), and the COND_WIDTH_STEP decides the width gradient value of the layer in the rule check trigger condition in the generated DRC test pattern. The gradient value corresponding to line end length is COND_LENGTH_STEP (the seventeenth column) and the COND_LENGTH_STEP decides the length gradient value of the layer in the rule check trigger condition in the generated DRC test pattern. For example, in the fourth rule, the type COND_CHARACTER of the rule check trigger condition is width, and the layer constraint interval COND_CONSTRAINTS in the rule check trigger condition is (0.8, 1.1], then the gradient value COND_WIDTH_STEP corresponding to the width is a ratio of the difference value between the interval upper limit value 1.1 and the interval lower limit value 0.8 to the number of erroneous patterns, i.e., (1.1-0.8)/B_P_NUM. In the fifth rule, the type COND_CHARACTER of the rule check trigger condition is line end width, and the layer constraint interval COND_CONSTRAINTS in the rule check trigger condition is [0.5,), then the gradient value COND_WIDTH_STEP corresponding to line end width is a ratio of the interval lower limit value 0.5 to the number of erroneous patterns, i.e., 0.5/B_P_NUM. In the sixth rule, the type COND_CHARACTER of the rule check trigger condition is line end length, and the layer constraint interval COND_CONSTRAINTS in the rule check trigger condition is (0, 0.88), then the gradient value COND_WIDTH_STEP corresponding to the line end length is a ratio of a difference value between the interval lower limit value 0.88 and the interval upper limit value 0 to the number of erroneous patterns, i.e., 0.88/B_P_NUM. An eighteenth column is the maximum number of rows and columns of the via, i.e., VIA MAX row/column, and according to this parameter, the parameterized pattern generator may decide the number of rows and columns of the via in the generated test pattern. The number is a maximum value, and the number of the vias in the generated test pattern may gradually change under the maximum value. It should be noted that nil in Table 2 represents null, and the value of an unrelated formatted parameter in each rule is null.

At S24, a corresponding number of correct patterns and a corresponding number of erroneous patterns corresponding to each rule are generated according to the formatted parameter information corresponding to each rule.

During specific implementation, the server invokes a preset test pattern generation engine corresponding to the rule type of each rule to generate, according to the gradient value corresponding to the rule type and the gradient value corresponding to the type of the rule check trigger condition, a corresponding number of correct patterns that satisfy the rule constraint interval and a corresponding number of erroneous patterns that do not satisfy the rule constraint interval corresponding to each rule.

Figure 3:
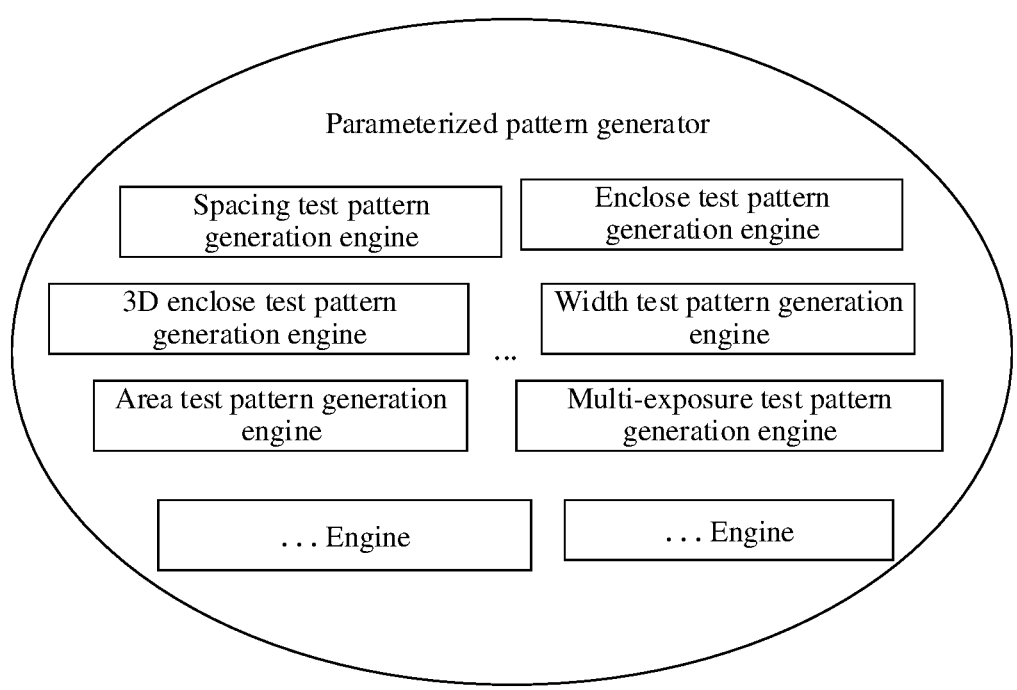
FIG. 3 is a structural diagram of a parameterized pattern generator provided by an embodiment of the disclosure.

Specifically, the parameterized pattern generator is preconfigured in the server and configured to generate the DRC test pattern. In the parameterized pattern generator, corresponding test pattern generation engines are configured for different rule types, such as, a width test pattern generation engine corresponding to the rule type that is width check, a spacing test pattern generation engine corresponding to the rule type that is spacing check, an area test pattern generation engine corresponding to the rule type that is area check, an enclose test pattern generation engine corresponding to the rule type that is enclose check, a 3D enclose test pattern generation engine corresponding to the rule type that is 3D enclose check, and a multi-exposure test pattern generation engine corresponding to the rule type that is multi-exposure check. The structural diagram of the parameterized pattern generator is as shown in FIG. 3.

During implementation, it is assumed that the number of correct patterns and the number of erroneous patterns designated by the user both are 3, then 3 correct patterns and 3 erroneous patterns may be generated for each rule. Table 2 has 7 rules, and then 21 correct patterns and 21 erroneous patterns may be automatically generated in a batch mode.

Description is made below by only taking the generation of the DRC test patterns corresponding to the spacing check of the fourth rule Metal1_R4, the width check of the first rule Metal1_R1, and the 3D ENC check of the seventh rule V1_R2 in Table 2 as examples.

Figure 4:
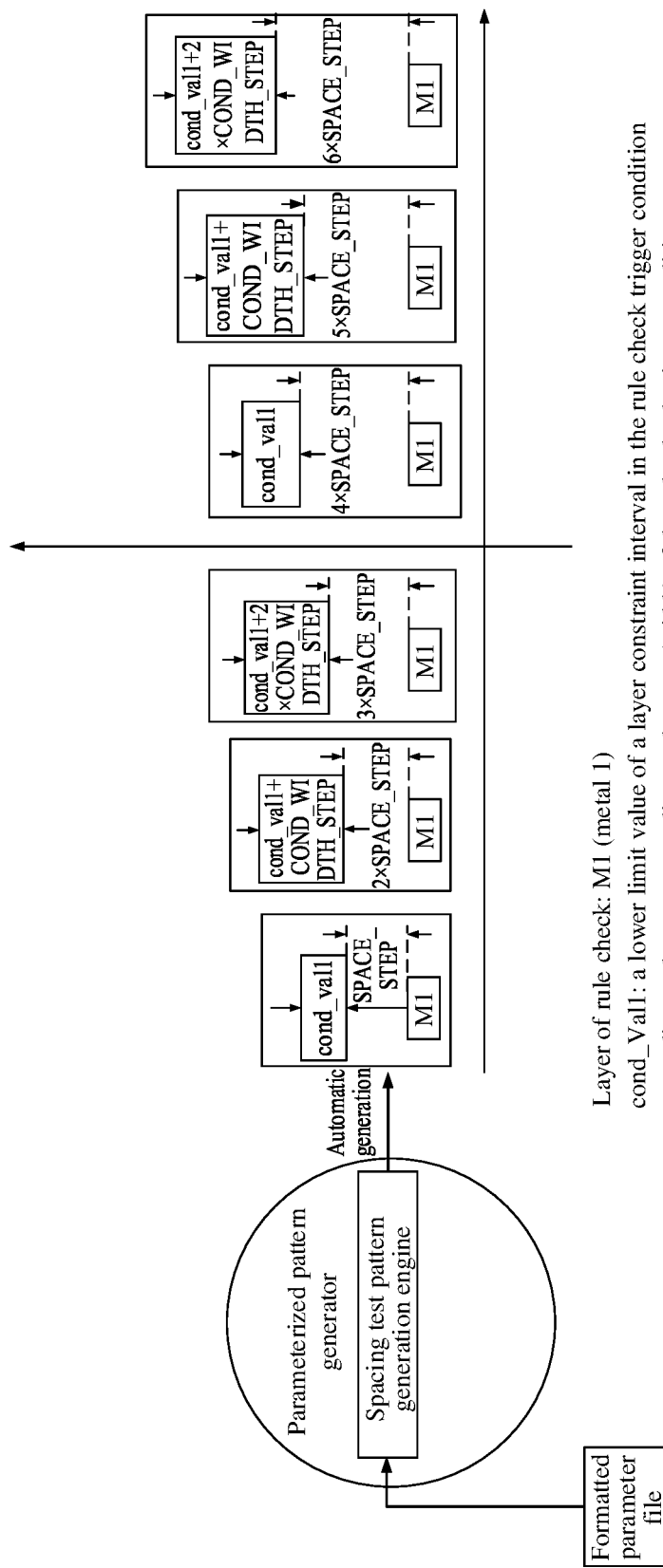
FIG. 4 is a schematic diagram of a spacing test pattern corresponding to a rule Metal1_R4 provided by an embodiment of the disclosure.

As shown in FIG. 4, FIG. 4 is a schematic diagram of a generated spacing test pattern corresponding to the fourth rule Metal1_R4. During implementation, the spacing test pattern generation engine is invoked to automatically generate a set of erroneous patterns and a set of correct patterns according to the formatted parameters corresponding to the fourth rule Metal1_R4 in the formatted parameter file, i.e., the parameters that the values corresponding to the rule in Table 2 are not null or 0. The formatted parameters of the fourth rule Metal1_R4 include: the rule identifier DRC_RULE_ID: Metal1_R4; the rule type RULE_TYPE: SPACING, i.e., spacing check; the layer of rule check LAYERS: M1, i.e., metal 1; the orientation of the layer LAYER_ORIENTATION: HORI (vertical); MIN_MAX: min, i.e., the rule constrains the minimum value; the rule constraint interval MIN_MAX: >0.11; the spacing gradient value SPACE_STEP=0.11/B_P_NUM=0.11/3; the layer COND_LAYER in the rule check trigger condition: M1; the type COND_CHARACTOR of the rule check trigger condition: width; and the layer constraint interval COND_CONSTRAINTS in the rule check trigger condition: greater than cond_val1 and less than or equal to cond_val2, e.g., within the range of (cond_val1, cond_val2]. Cond_val1 is the interval lower limit value of COND_CONSTRAINTS, i.e., 0.8, and cond_val2 is the interval upper limit value of COND_CONSTRAINTS, i.e., 1.1. The gradient value COND_WIDTH_STEP corresponding to the type (width) of the rule check trigger condition is |cond_val2-cond_val1|/B_P_NUM=(1.1−0.8)/3=0.1. SPACE_STEP=0.11/3, and COND_WIDTH_STEP=0.1, and then the upper line widths of the layers M1 in the set of erroneous patterns and the set of correct patterns are sequentially set as cond_val1=0.8, cond_val1+COND_WIDTH_STEP=0.8+0.1=0.9, and cond_val1+2*COND_WIDTH_STEP=0.8+2*0.1=1. In the set of erroneous patterns, the spacings between the lower lines and the upper lines in the layers M1 are sequentially set as SPACE_STEP=0.11/3, 2*SPACE_STEP=0.22/3, and 3*SPACE_STEP=0.11. In the set of correct patterns, the spacings between the lower lines and the upper lines in the layer M1 are sequentially set as 4*SPACE_STEP=0.44/3, 5*SPACESTEP=0.55/3, and 6*SPACESTEP=0.22. Therefore, it can be seen from the above that in the three erroneous patterns, the spacings between the lower lines and the upper lines in the first two patterns both do not satisfy the rule constraint interval CONSTRAINTS: [0.11,), but the spacing between the lower line and the upper line in the third erroneous pattern is 0.11 and satisfies the rule constraint interval CONSTRAINTS: [0.11,), and therefore, the third erroneous pattern is a correct pattern. During specific implementation, in order to avoid this case, in one implementation, when the spacing between two lines in the erroneous pattern may be set, a small preset value is subtracted from the value of SPACE_STEP. Therefore, it may be ensured that the third pattern is the erroneous pattern. The preset value may be set according to a requirement. The embodiments of the disclosure do not limit this. On this basis, during the generation of the test patterns corresponding to other rule types, the gradient values corresponding to the rule types all may be similarly set, and the details are not described in the embodiments of the disclosure again.

Figure 5:
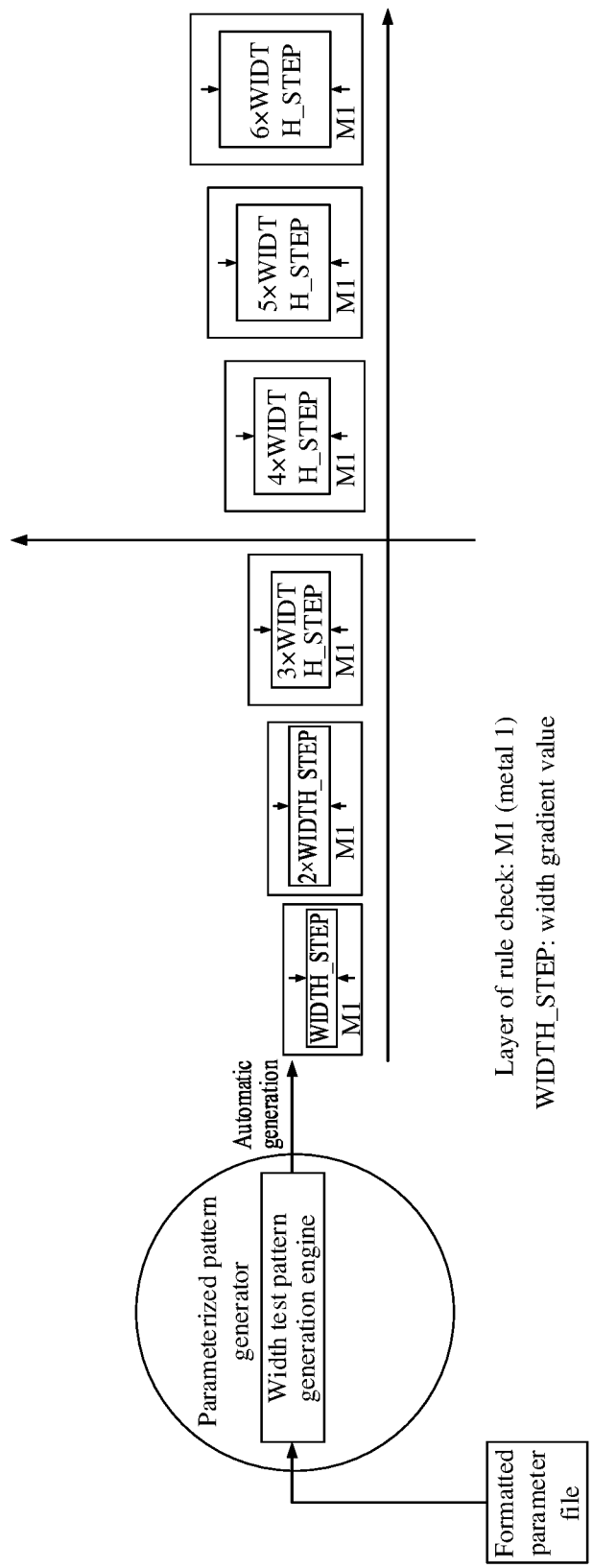
FIG. 5 is a schematic diagram of a width test pattern corresponding to a rule Metal1_R1 provided by an embodiment of the disclosure.

As shown in FIG. 5, FIG. 5 is a schematic diagram of a generated width test pattern corresponding to the first rule Metal1_R1. During implementation, the width test pattern generation engine is invoked to automatically generate a set of erroneous patterns and a set of correct patterns according to the formatted parameters corresponding to the first rule Metal1_R1 in the formatted parameter file, i.e., the parameters that the values corresponding to the rule in Table 2 are not null or 0. The formatted parameters of the first rule Metal1_R1 include: the rule identifier DRC_RULE_ID: Metal1_R1; the rule type RULE_TYPE: WIDTH, i.e., width check; the layer of rule check LAYERS: M1, i.e., metal 1; the orientation of the layer LAYER_ORIENTATION: HORI (vertical); MIN_MAX: min, i.e., the rule constrains the minimum value; the rule constraint interval CONSTRAINTS: >0.55; and the width gradient value WIDTH_STEP=0.55/B_P_NUM=0.55/3. In a set of erroneous patterns on the left, the line widths of the lines in the layers M1 are sequentially set as WIDTH_STEP=0.55/3, 2*WIDTH_STEP=1.1/3, and 3*WIDTH_STEP=0.55. The line widths set in a first erroneous pattern and a second erroneous pattern both do not satisfy CONSTRAINTS: [0.55,), but the line width set in a third erroneous pattern satisfies CONSTRAINTS. As the generation of the spacing test pattern, one small preset value may be subtracted from WIDTH_STEP, so as to ensure that the last erroneous pattern does not satisfy CONSTRAINTS. Therefore, it may be ensured that the set of patterns all are erroneous patterns. In a set of correct patterns on the right, the line widths of the layers M1 are sequentially set as 4*WIDTH_STEP=2.2/3, 5*WIDTH_STEP=2.75/3, and 6*WIDTH_STEP=1.1. The line width of the layer M1 of each correct pattern satisfies CONSTRAINTS: [0.55,).

Figure 6:
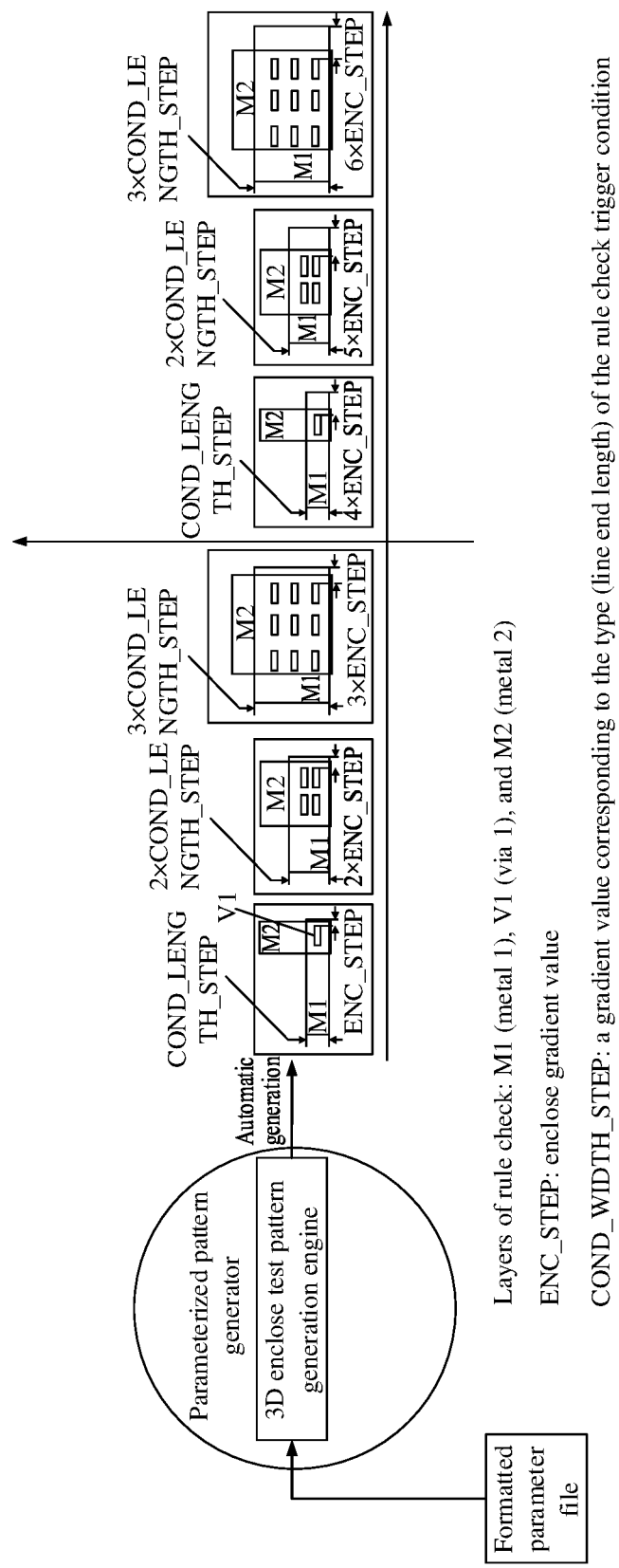
FIG. 6 is a schematic diagram of a 3D enclose test pattern corresponding to a rule V1_R2 provided by an embodiment of the disclosure.

As shown in FIG. 6, FIG. 6 is a schematic diagram of a generated 3D enclose test pattern corresponding to the seventh rule V1_R2. During implementation, the width test pattern generation engine is invoked to automatically generate a set of erroneous patterns and a set of correct patterns according to the formatted parameters corresponding to the first rule V1_R2 in the formatted parameter file, i.e., the parameters that the values corresponding to the rule in Table 2 are not null or 0. The formatted parameters of the seventh rule V1_R2 include: the rule identifier DRC_RULE_ID: V1_R2; the rule type RULE_TYPE: ENC, 3D:1, i.e., 3D enclose check; the layer of rule check LAYERS: M1, V1, and M2; the orientation of the layer LAYER_ORIENTATION: HORI (vertical); MIN_MAX: min, i.e., the rule constrains the minimum value; the rule constraint interval CONSTRAINTS: >2.11; the enclose gradient value ENC_STEP=2.11/B_P_NUM=2.11/3; the layer COND_LAYER in the rule check trigger condition: M1; the type COND_CHARACTOR of the rule check trigger condition: line end length; the layer constraint interval COND_CONSTRAINTS in the rule check trigger condition: <0.88; the gradient value corresponding to the line end length of the rule check trigger condition: COND_LENGTH_STEP=0.88/B_P_NUM=0.88/3; and VIA-MAXrow/column is 3:3, i.e., the maximum number of the rows and that of columns of the vias both are 3. ENC_STEP=2.11/3, and COND_LENGTH_STEP=0.88/B_P_NUM=0.88/3. In a set of erroneous patterns on the left, the line widths of the layers M1 are sequentially set as COND_LENGTH_STEP=0.88/3, 2*COND_LENGTH_STEP=1.76/3, and 3*COND_LENGTH_STEP=0.88; the line end lengths of the layers M1 and M2 are sequentially set as ENC_STEP=2.11/3, 2*ENC_STEP=4.22/3, and 3*ENC_STEP=2.11; one via V1, 2*2 (i.e., two rows and two columns) vias V1, and 3*3 (i.e., three rows and three columns) vias V1 are sequentially formed between the layers M1 and M2. In a set of correct patterns on the right, the line widths of the layers M1 are sequentially set as COND_LENGTH_STEP=0.88/3, 2*COND_LENGTH_STEP=1.76/3, and 3*COND_LENGTH_STEP=0.88; the line end lengths of the layers M1 and M2 are sequentially set as 4*ENC_STEP=8.44/3, 5*ENC_STEP=10.55/3, and 6*ENC_STEP=4.22; one via, 2*2 (i.e., two rows and two columns) vias, and 3*3 (i.e., three rows and three columns) vias are sequentially formed between the layers M1 and M2; and in order to ensure the last erroneous pattern does not satisfy CONSTRAINTS, one small preset value is subtracted from the value of ENC_STEP.

During specific implementation, in order to improve the generation efficiency of the DRC test pattern, the foregoing test pattern generation engines may be concurrently run when generating the corresponding test patterns. An output DRC test pattern set is as shown in FIG. 7, and is generated by the parameterized pattern generator. It should be noted that finally generated test patterns are a set of correct test patterns and a set of error test patterns corresponding to each rule in Table 2. FIG. 7 only shows the test patterns corresponding to the foregoing three rules, and the test patterns corresponding to the remaining rules are not shown.

In the DRC test pattern generation method provided by the embodiments of the disclosure, a user may pre-designate the number of correct DRC test patterns and the number of error DRC test patterns that are generated. The parameter parser parses parameter information corresponding to each rule in the layout design rule manual and the process layer configuration parameter information in the layer configuration file corresponding to the layout design rule manual at the same time; and by combining the parsed parameter information corresponding to each rule in the layout design rule manual, process layer configuration parameter information associated with each rule, the number of correct patterns, and the number of erroneous patterns, generates the formatted parameter information corresponding to each rule in the layout design rule manual. The parameters included in the generated formatted parameter information are more complete and normative. For each rule, the parameterized generator automatically generates a designated number of correct patterns and a designated number of erroneous patterns in batch according to the formatted parameter information corresponding to each rule, and therefore, while the generation efficiency of the DRC test pattern is improved, the generated correct pattern and erroneous pattern include each design rule in the layout design rule manual, thereby being capable of further improving the accuracy of a DRC file.

Based on the same inventive concept, the embodiments of the disclosure further provide a DRC test pattern generation apparatus. Reference can be made to the implementations of the method for the implementation of the foregoing apparatus. Details are not described herein again.

Figure 8:
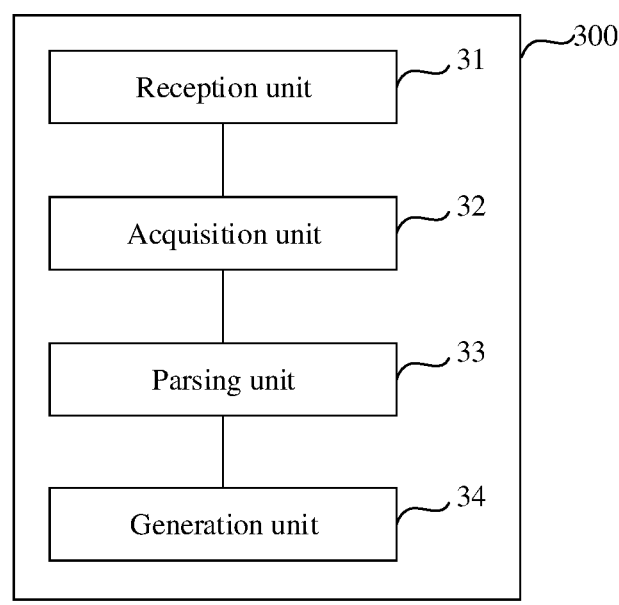
FIG. 8 is a schematic structural diagram of a DRC test pattern generation apparatus provided by an embodiment of the disclosure.

FIG. 8 is a schematic structural diagram of a DRC test pattern generation apparatus 300 provided by an embodiment of the disclosure. The apparatus may include a reception unit 31, an acquisition unit 32, a parsing unit 33 and a generation unit 34.

The reception unit 31 is configured to receive a DRC test pattern generation request, the DRC test pattern generation request carrying the number of correct patterns and the number of erroneous patterns.

The acquisition unit 32 is configured to acquire layout design rule information and corresponding layer configuration information, the layer configuration information including process layer configuration parameter information that is set according to a process type.

The parsing unit 33 is configured to parse parameter information corresponding to each rule in the layout design rule information and the process layer configuration parameter information in the layer configuration information, and generate formatted parameter information corresponding to each rule according to the parameter information corresponding to each rule, process layer configuration parameter information associated with each rule, the number of correct patterns, and the number of erroneous patterns, respectively.

The generation unit 34 is configured to generate a corresponding number of correct patterns and a corresponding number of erroneous patterns corresponding to each rule according to the formatted parameter information corresponding to each rule.

In one possible implementation, a formatted parameter includes a rule parameter, a rule-related process layer configuration parameter, and a DRC test pattern generation step size parameter.

In one possible implementation, the rule parameter at least includes a rule type, a rule constraint interval, the type of the rule check trigger condition, and a layer constraint interval in the rule check trigger condition. The rule-related process layer configuration parameter includes a layer of a rule check, a layer attribute parameter, and a layer in the rule check trigger condition. The DRC test pattern generation step size parameter includes a gradient value corresponding to the rule type and a gradient value corresponding to the type of the rule check trigger condition.

In one possible implementation, the gradient value corresponding to the rule type is determined according to the rule constraint interval, the number of correct patterns, and the number of erroneous patterns; and the gradient value corresponding to the type of the rule check trigger condition is determined according to the layer constraint interval in the rule check trigger condition, the number of correct patterns, and the number of erroneous patterns.

The generation unit 34 is specifically configured to invoke a preset test pattern generation engine corresponding to the rule type of each rule to generate, according to the gradient value corresponding to the rule type and the gradient value corresponding to the type of the rule check trigger condition, the corresponding number of correct patterns that satisfy the rule constraint interval and the corresponding number of erroneous patterns that do not satisfy the rule constraint interval corresponding to each rule.

In one possible implementation, the parsing unit 33 is specifically configured to determine the gradient value corresponding to the rule type according to the following modes: in response to determining that the rule constraint interval only includes an interval lower limit value, determining a ratio of the interval lower limit value to the number of erroneous patterns as the gradient value corresponding to the rule type; and in response to determining that the rule constraint interval only includes an interval upper limit value, determining a ratio of the interval upper limit value to the number of correct patterns as the gradient value corresponding to the rule type.

In one possible implementation, the parsing unit 33 is specifically configured to determine the gradient value corresponding to the type of the rule check trigger condition according to the following modes: in response to determining that the layer constraint interval in the rule check trigger condition only includes an interval lower limit value, determining a ratio of the interval lower limit value to the number of erroneous patterns as the gradient value corresponding to the type of the rule check trigger condition; and in response to determining that the layer constraint interval in the rule check trigger condition includes the interval lower limit value and an interval upper limit value, determining a ratio of a difference value between the interval upper limit value and the interval lower limit value to the number of erroneous patterns as the gradient value corresponding to the type of the rule check trigger condition.

Figure 9:
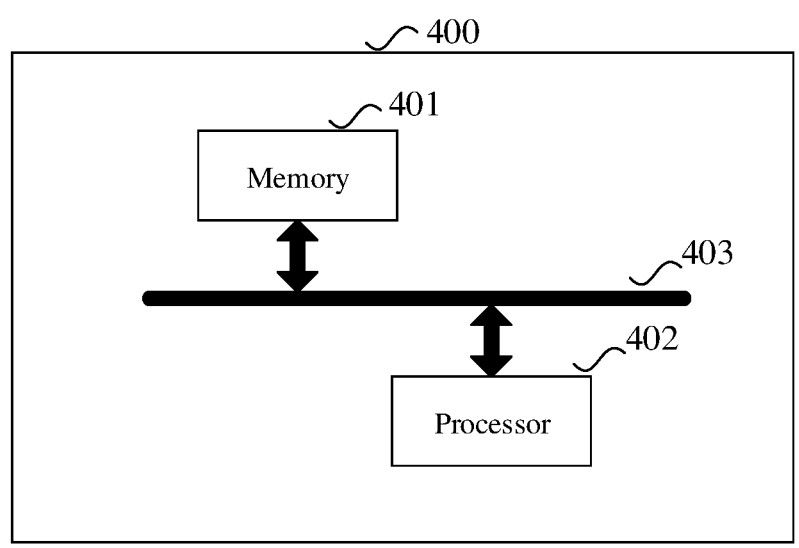
FIG. 9 is a schematic structural diagram of an electronic device provided by an embodiment of the disclosure.

Based on the same inventive concept, the embodiments of the disclosure further provide an electronic device 400. With reference to FIG. 9, the electronic device 400 is configured to implement the DRC test pattern generation method recited in the foregoing method embodiment or the DRC test pattern generation apparatus. The electronic device 400 of the embodiment may include a memory 401, a processor 402, and a computer program stored on the memory and runnable on the processor, such as a DRC test pattern generation program or a data packet transmission program. When executing the computer program, the processor implements the steps in the aforementioned embodiments of the DRC test pattern generation method, for example, step S21 illustrated in FIG. 2.

The embodiments of the disclosure do not limit a specific connection medium between the foregoing memory 401 and the processor 402. In the embodiments of the disclosure, in FIG. 9, the memory 401 and the processor 402 is connected by means of a bus 403. The bus 403 is represented by a bold line in FIG. 9. A connection mode between the remaining components is only schematically described, but is not used as a limitation. The bus 403 can be divided into an address bus, a data bus, a control bus, etc. For ease of representation, only one bold line is used in FIG. 9, but it does not mean that there is only one bus or one type of bus.

The memory 401 may be a volatile memory, such as a Random-Access Memory (RAM). The memory 401 may also be a non-volatile memory, such as a read-only memory, a flash memory, a Hard Disk Drive (HDD), or a Solid-State Drive (SSD). In an embodiment, the memory 401 is any other medium that may be configured to carry or store an expected program code having an instruction or data structure form, and that may be accessed by a computer, but is not limited thereto. The memory 401 may be a combination of the foregoing memories.

The processor 402 is configured to implement the DRC test pattern generation method shown in FIG. 2.

The embodiments of the disclosure further provide a computer-readable storage medium, storing a computer executable instruction required to be executed by the foregoing processor, and including a program required to be executed by the foregoing processor.

In some possible implementations, the aspects of the DRC test pattern generation method provided by the disclosure may be further implemented in a form of a program product, including a program code. When the program product is run on an electronic device, the program code is configured to cause the electronic device to implement the steps in the DRC test pattern generation method described in the description according to various exemplary implementations of the disclosure.

A person skilled in the art should understand that the embodiments of the disclosure may provide a method, an apparatus or a computer program product. Therefore, the disclosure may use the forms of hardware embodiments, software embodiments, or the embodiments of combining software and hardware aspects. Moreover, the disclosure may use the form of the computer program product implemented over one or more computer usable storage mediums (including but not limited to a disk memory, a CD-ROM, and an optical memory, etc.) that include a computer usable program code.

The disclosure is described with reference to flowcharts and/or block diagrams of the method, the device (apparatus), and the computer program product of the embodiments of the disclosure. It should be understood that a computer program instruction may be configured to implement each flow and/or block in the flowcharts and/or block diagrams, and the combination of flows/blocks in the flowcharts and/or block diagrams. These computer program instructions may be provided to a processor of a general purpose computer, a special purpose computer, an embedded processor or other programmable data processing devices to produce a machine, so that the instructions are executed by the processor of a computer or other programmable data processing devices to produce an apparatus for implementing functions specified in one or more flows of the flowcharts or in one or more blocks of the block diagrams.

These computer program instructions may also be stored in a computer readable memory that can direct the computer or other programmable data processing devices to work in a particular manner such that the instruction stored in the computer readable memory produces a product including an instruction apparatus. The instruction apparatus implements the functions specified in one or more flows of the flowchart and/or in one or more blocks of the block diagram.

These computer program instructions may also be loaded in a computer or other programmable data processing devices such that a series of operation steps are executed on the computer or other programmable data processing devices to produce computer implemented processing, and thus the instruction executed on the computer or other programmable data processing devices provides the steps for implementing the functions specified in one or more flows of the flowchart and/or one or more blocks of the block diagram.

Although some embodiments of the disclosure have been described, a person skilled in the art can make changes and modifications to the embodiments once learning of the basic inventive concept.

It is apparent that a person skilled in the art may make various modifications and variations to the disclosure without departing from the spirit and scope of the disclosure. Therefore, if these modifications and variations of the disclosure fall within the scope of the claims of the disclosure and the equivalent technologies thereof, the disclosure is also intended to include the modifications and variations.

What is claimed is:

1. A design rule check (DRC) test pattern generation method, comprising:
    receiving a DRC test pattern generation request, wherein the DRC test pattern generation request carries a number of correct patterns and a number of erroneous patterns;
    acquiring layout design rule information and corresponding layer configuration information, wherein the layer configuration information comprises process layer configuration parameter information that is set according to a process type;
    parsing parameter information corresponding to each rule in the layout design rule information and the process layer configuration parameter information in the layer configuration information, and generating formatted parameter information corresponding to the each rule according to the parameter information corresponding to the each rule, process layer configuration parameter information associated with the each rule, the number of correct patterns, and the number of erroneous patterns, respectively; and
    generating a corresponding number of correct patterns and a corresponding number of erroneous patterns corresponding to the each rule according to the formatted parameter information corresponding to the each rule;
    wherein a formatted parameter comprises a rule parameter, a rule-related process layer configuration parameter, and a DRC test pattern generation step size parameter;
    wherein the rule parameter at least comprises a rule type, a rule constraint interval, a type of a rule check trigger condition, and a layer constraint interval in the rule check trigger condition; the rule-related process layer configuration parameter comprises a layer of a rule check, a layer attribute parameter, and a layer in the rule check trigger condition;
    and the DRC test pattern generation step size parameter comprises a gradient value corresponding to the rule type and a gradient value corresponding to the type of the rule check trigger condition;
    wherein the gradient value corresponding to the rule type is determined according to the rule constraint interval, the number of correct patterns, and the number of erroneous patterns; the gradient value corresponding to the type of the rule check trigger condition is determined according to the layer constraint interval in the rule check trigger condition, the number of correct patterns, and the number of erroneous patterns;
    wherein generating the corresponding number of correct patterns and the corresponding number of erroneous patterns corresponding to the each rule according to the formatted parameter information corresponding to the each rule comprises:
    invoking a preset test pattern generation engine corresponding to the rule type of the each rule to generate, according to the gradient value corresponding to the rule type and the gradient value corresponding to the type of the rule check trigger condition, the corresponding number of correct patterns that satisfy the rule constraint interval and the corresponding number of erroneous patterns that do not satisfy the rule constraint interval corresponding to the each rule.

2. The method of claim 1, wherein the gradient value corresponding to the rule type is determined according to following modes:
    in response to determining that the rule constraint interval only comprises an interval lower limit value, determining a ratio of the interval lower limit value to the number of erroneous patterns as the gradient value corresponding to the rule type; and
    in response to determining that the rule constraint interval comprises an interval upper limit value, determining a ratio of the interval upper limit value to the number of correct patterns as the gradient value corresponding to the rule type.

3. The method of claim 1, wherein the gradient value corresponding to the type of the rule check trigger condition is determined according to following modes:
    in response to determining that the layer constraint interval in the rule check trigger condition only comprises an interval lower limit value, determining a ratio of the interval lower limit value to the number of erroneous patterns as the gradient value corresponding to the type of the rule check trigger condition; and
    in response to determining that the layer constraint interval in the rule check trigger condition comprises the interval lower limit value and an interval upper limit value, determining a ratio of a difference value between the interval upper limit value and the interval lower limit value to the number of erroneous patterns as the gradient value corresponding to the type of the rule check trigger condition.

4. An electronic device, comprising a memory and a processor,
wherein the memory is configured to store a computer program executable by the processor,
wherein when executing the computer program, the processor is configured to:
receive a DRC test pattern generation request, wherein the DRC test pattern generation request carries a number of correct patterns and a number of erroneous patterns;
acquire layout design rule information and corresponding layer configuration information, wherein the layer configuration information comprises process layer configuration parameter information that is set according to a process type;
parse parameter information corresponding to each rule in the layout design rule information and the process layer configuration parameter information in the layer configuration information, and generate formatted parameter information corresponding to the each rule according to the parameter information corresponding to the each rule, process layer configuration parameter information associated with the each rule, the number of correct patterns, and the number of erroneous patterns, respectively; and
generate a corresponding number of correct patterns and a corresponding number of erroneous patterns corresponding to the each rule according to the formatted parameter information corresponding to the each rule;
wherein a formatted parameter comprises a rule parameter, a rule-related process layer configuration parameter, and a DRC test pattern generation step size parameter;
wherein the rule parameter at least comprises a rule type, a rule constraint interval, a type of a rule check trigger condition, and a layer constraint interval in the rule check trigger condition; the rule-related process layer configuration parameter comprises a layer of a rule check, a layer attribute parameter, and a layer in the rule check trigger condition;
and the DRC test pattern generation step size parameter comprises a gradient value corresponding to the rule type and a gradient value corresponding to the type of the rule check trigger condition;
wherein the gradient value corresponding to the rule type is determined according to the rule constraint interval, the number of correct patterns, and the number of erroneous patterns; the gradient value corresponding to the type of the rule check trigger condition is determined according to the layer constraint interval in the rule check trigger condition, the number of correct patterns, and the number of erroneous patterns;
wherein the processor is further configured to:
invoke a preset test pattern generation engine corresponding to the rule type of the each rule to generate, according to the gradient value corresponding to the rule type and the gradient value corresponding to the type of the rule check trigger condition, the corresponding number of correct patterns that satisfy the rule constraint interval and the corresponding number of erroneous patterns that do not satisfy the rule constraint interval corresponding to the each rule.

5. The electronic device of claim 4, wherein the gradient value corresponding to the rule type is determined according to following modes:
in response to determining that the rule constraint interval only comprises an interval lower limit value, determining a ratio of the interval lower limit value to the number of erroneous patterns as the gradient value corresponding to the rule type; and
in response to determining that the rule constraint interval comprises an interval upper limit value, determining a ratio of the interval upper limit value to the number of correct patterns as the gradient value corresponding to the rule type.

6. The electronic device of claim 4, wherein the gradient value corresponding to the type of the rule check trigger condition is determined according to following modes:
in response to determining that the layer constraint interval in the rule check trigger condition only comprises an interval lower limit value, determining a ratio of the interval lower limit value to the number of erroneous patterns as the gradient value corresponding to the type of the rule check trigger condition; and
in response to determining that the layer constraint interval in the rule check trigger condition comprises the interval lower limit value and an interval upper limit value, determining a ratio of a difference value between the interval upper limit value and the interval lower limit value to the number of erroneous patterns as the gradient value corresponding to the type of the rule check trigger condition.

7. A nonvolatile computer-readable storage medium, having a computer program stored thereon, wherein when executed by a processor, the program is configured to:
receive a DRC test pattern generation request, wherein the DRC test pattern generation request carries a number of correct patterns and a number of erroneous patterns;
acquire layout design rule information and corresponding layer configuration information, wherein the layer configuration information comprises process layer configuration parameter information that is set according to a process type;
parse parameter information corresponding to each rule in the layout design rule information and the process layer configuration parameter information in the layer configuration information, and generate formatted parameter information corresponding to the each rule according to the parameter information corresponding to the each rule, process layer configuration parameter information associated with the each rule, the number of correct patterns, and the number of erroneous patterns, respectively; and
generate a corresponding number of correct patterns and a corresponding number of erroneous patterns corresponding to the each rule according to the formatted parameter information corresponding to the each rule;
wherein a formatted parameter comprises a rule parameter, a rule-related process layer configuration parameter, and a DRC test pattern generation step size parameter;
wherein the rule parameter at least comprises a rule type, a rule constraint interval, a type of a rule check trigger condition, and a layer constraint interval in the rule check trigger condition; the rule-related process layer configuration parameter comprises a layer of a rule check, a layer attribute parameter, and a layer in the rule check trigger condition;
and the DRC test pattern generation step size parameter comprises a gradient value corresponding to the rule type and a gradient value corresponding to the type of the rule check trigger condition;
wherein the gradient value corresponding to the rule type is determined according to the rule constraint interval, the number of correct patterns, and the number of erroneous patterns; the gradient value corresponding to the type of the rule check trigger condition is determined according to the layer constraint interval in the rule check trigger condition, the number of correct patterns, and the number of erroneous patterns;

wherein the program is further configured to:

invoke a preset test pattern generation engine corresponding to the rule type of the each rule to generate, according to the gradient value corresponding to the rule type and the gradient value corresponding to the type of the rule check trigger condition, the corresponding number of correct patterns that satisfy the rule constraint interval and the corresponding number of erroneous patterns that do not satisfy the rule constraint interval corresponding to the each rule.

8. The storage medium of claim 7, wherein the gradient value corresponding to the rule type is determined according to following modes:

in response to determining that the rule constraint interval only comprises an interval lower limit value, determining a ratio of the interval lower limit value to the number of erroneous patterns as the gradient value corresponding to the rule type; and in response to determining that the rule constraint interval comprises an interval upper limit value, determining a ratio of the interval upper limit value to the number of correct patterns as the gradient value corresponding to the rule type.

9. The storage medium of claim 8, wherein the gradient value corresponding to the type of the rule check trigger condition is determined according to following modes:

in response to determining that the layer constraint interval in the rule check trigger condition only comprises an interval lower limit value, determining a ratio of the interval lower limit value to the number of erroneous patterns as the gradient value corresponding to the type of the rule check trigger condition; and in response to determining that the layer constraint interval in the rule check trigger condition comprises the interval lower limit value and an interval upper limit value, determining a ratio of a difference value between the interval upper limit value and the interval lower limit value to the number of erroneous patterns as the gradient value corresponding to the type of the rule check trigger condition.

* * * * *